US012654328B2

(12) United States Patent
Kanunikov et al.

(10) Patent No.: US 12,654,328 B2
(45) Date of Patent: Jun. 16, 2026

(54) ROBOTIC SYSTEM WITH MULTI-LOCATION PLACEMENT CONTROL MECHANISM

(71) Applicant: MUJIN, Inc., Tokyo (JP)

(72) Inventors: Denys Kanunikov, Tokyo (JP); Rosen Nikolaev Diankov, Tokyo (JP); Sergey Pavlov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 180 days.

(21) Appl. No.: 18/518,278

(22) Filed: Nov. 22, 2023

(65) Prior Publication Data

US 2024/0173866 A1    May 30, 2024

Related U.S. Application Data

(60) Provisional application No. 63/428,110, filed on Nov. 27, 2022.

(51) Int. Cl.
B25J 9/16    (2006.01)

(52) U.S. Cl.
CPC ........... B25J 9/1687 (2013.01); B25J 9/1664 (2013.01); B25J 9/1697 (2013.01)

(58) Field of Classification Search
None
See application file for complete search history.

(56) References Cited

U.S. PATENT DOCUMENTS

| | | | | |
|---|---|---|---|---|
| 7,266,422 | B1 * | 9/2007 | DeMotte | ................ B25J 9/1687 414/801 |
| 10,647,528 | B1 * | 5/2020 | Diankov | ................ B65G 47/90 |
| 2004/0129150 | A1 * | 7/2004 | Lancaster, III | ........ B65G 61/00 99/486 |
| 2010/0222915 | A1 * | 9/2010 | Kuehnemann | ......... G06Q 10/08 706/14 |
| 2021/0129334 | A1 * | 5/2021 | Kanunikov | ............ B65G 61/00 |

* cited by examiner

*Primary Examiner* — Adam R Mott
*Assistant Examiner* — Alan Lindsay Ostrow
(74) *Attorney, Agent, or Firm* — Dorsey & Whitney LLP

(57)    ABSTRACT

A system and method for operating a robotic system to place objects on multiple placement locations on a given surface. The robotic system may use a sequence for such placement locations to control the placement of objects onto the placement locations.

20 Claims, 9 Drawing Sheets

700

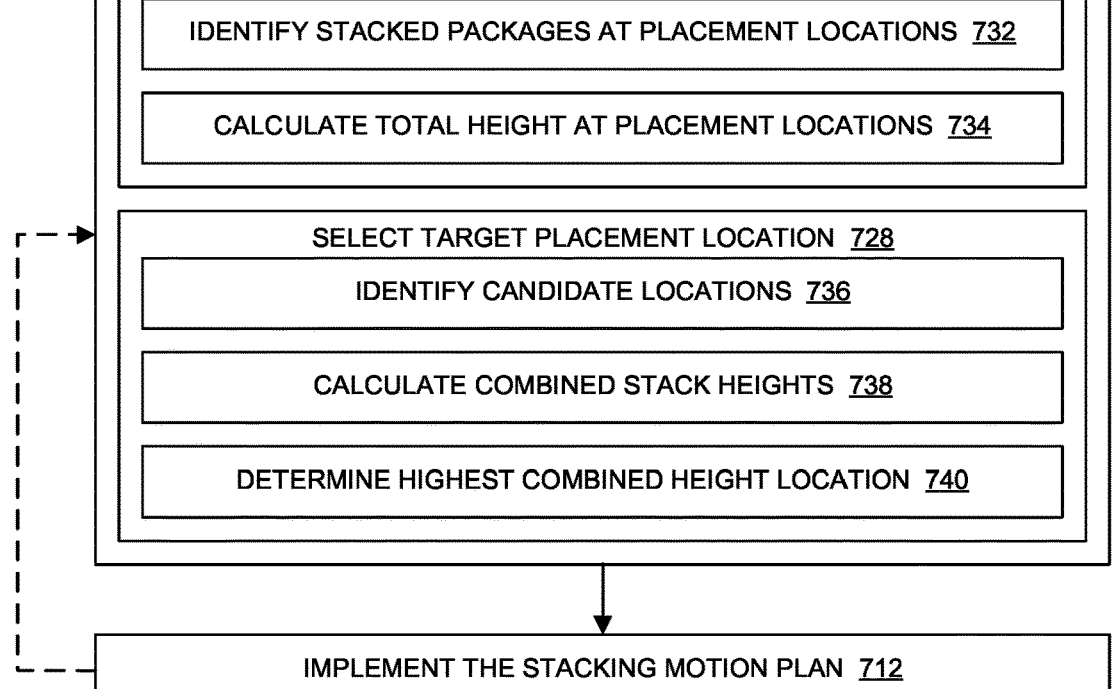

IDENTIFY PACKAGE OBJECTS AND PLACEMENT PLATFORM 702

OBTAIN PROPERTIES OF OBJECTS 704

DETERMINE STACKING POSE AND BASE AREAS 706

DETERMINE PLACEMENT LOCATIONS 708

COMPUTE LOCATION DISTANCES FROM ROBOT UNIT 722

GENERATE SEQUENCE IDENTIFIER FOR LOCATIONS 724

DETERMINE TARGET PLACEMENT LOCATION FOR TARGET PACKAGE 710

COMPUTE CURRENT STACK HEIGHTS 726

IDENTIFY STACKED PACKAGES AT PLACEMENT LOCATIONS 732

CALCULATE TOTAL HEIGHT AT PLACEMENT LOCATIONS 734

SELECT TARGET PLACEMENT LOCATION 728

IDENTIFY CANDIDATE LOCATIONS 736

CALCULATE COMBINED STACK HEIGHTS 738

DETERMINE HIGHEST COMBINED HEIGHT LOCATION 740

IMPLEMENT THE STACKING MOTION PLAN 712

*FIG. 7*

ROBOTIC SYSTEM WITH MULTI-LOCATION PLACEMENT CONTROL MECHANISM

CROSS-REFERENCE TO RELATED APPLICATION(S)

This application claims the benefit of U.S. Provisional Patent Application Ser. No. 63/428,110, filed Nov. 27, 2022, which is incorporated by reference herein in its entirety.

TECHNICAL FIELD

The present technology is directed generally to robotic systems and, more specifically, to systems, processes, and techniques for managing placement of objects.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, placement and/or packaging, transport and/or shipping, etc. In executing the tasks, the robots aim to replicate some aspects of human actions, thereby replacing or reducing the human involvement that would otherwise be required to perform tasks.

However, despite the technological advancements, robots often lack the sophistication necessary to duplicate human sensitivity and/or adaptability required for executing more complex and intricate tasks. For example, robots often lack the granularity of control and flexibility in the executed actions to fully utilize available resources. Also, human behavior and experience required to perform the task successfully under various real-world conditions is often difficult to capture or translate for robotic implementation. Accordingly, there remains a need for improved techniques and systems for controlling and managing various aspects of the robots to complete the tasks despite the various real-world factors.

BRIEF DESCRIPTION OF THE DRAWINGS

FIG. 7 is a flow diagram for a first example method of operating the robotic system of FIG. 1 in accordance with one or more embodiments of the present technology.

DETAILED DESCRIPTION

Figure 1:
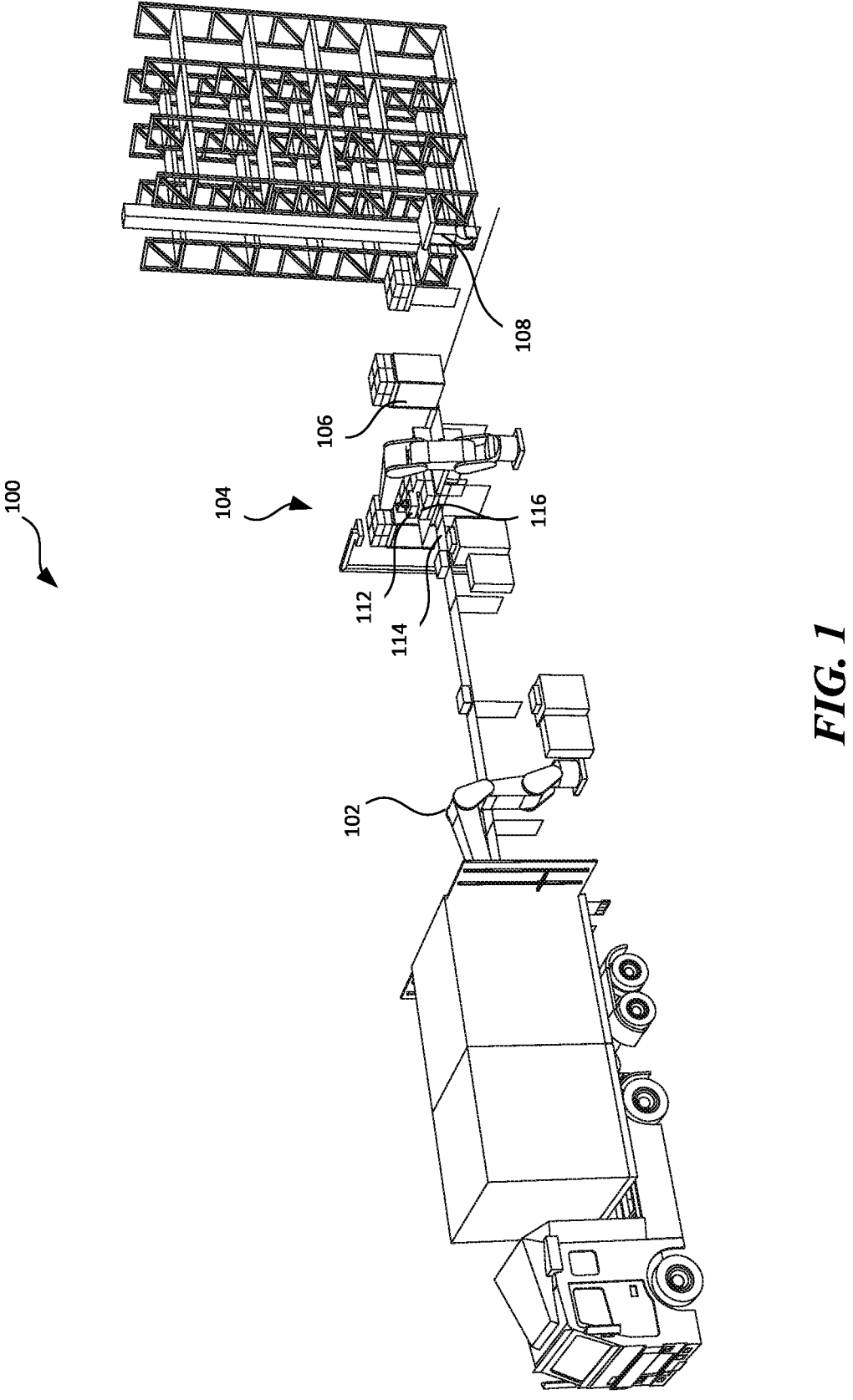
FIG. 1 is an illustration of an example environment in which a robotic system with a multi-location placement control mechanism may operate.

Systems and methods for robotic systems with multi-location placement control mechanisms are described herein. A robotic system (e.g., an integrated system of devices that executes one or more designated tasks) can be configured to provide enhanced control, usability, and flexibility by placing objects (e.g., packages, boxes, cases, etc.) on placement platforms. For example, the robotic system can stack one or more objects at each of the placement platforms, such as pallets, while adhering with an assigned stacking height limit 530 for each placement platform.

The robotic system can place and stack the objects at placement platforms based on identifying distinct placement areas within a task location. As an illustrative example, the robotic system can control a palletizing robot at the task location to place objects on one or more pallets (e.g., the placement platforms) located at the task location. Each pallet can have multiple distinct placement areas thereon, such as for forming multiple separate stacks of objects on one pallet or each of the pallets.

The distinct placement areas (e.g., stack locations) can be computed based on fixed or matching base dimensions (e.g., length and width) of the objects. In other embodiments, each of the distinct placement areas can correspond to a unique footprint (e.g., a unique shape, a unique set of lateral dimensions, and/or a corresponding pose of an object) for one or more objects. In other words, each distinct placement areas can computed or designated to be for placing or stacking one or more types of objects having matching or otherwise related footprints. In some embodiments, the robotic system can generate individual stacking height limits for each distinct placement area. Further, the robotic system can dynamically adjust the stacking height limit 530 for the distinct placement areas.

As objects are transferred, the robotic system can dynamically track the implementations of the motion plans to track and identify already-placed objects (e.g., objects within each stack or a top-most object), a stack height, and/or characteristic properties (e.g., dimensions) of objects at each of the distinct placement areas. In some embodiments, the robotic system can calculate/estimate a current stack height using the known dimensions and tracked orientations of objects previously placed at each of the distinct placement areas. In other embodiments, the robotic system can use sensor data to determine in real-time the stack heights at the distinct placement areas. The robotic system can use the current stack height to calculate a candidate stack height that would result from placing the target object according to a pose at the corresponding distinct placement area. Using the candidate stack heights, the robotic system can determine whether placing the target object at candidate placement area adheres to the stacking height limit 530 and corresponding rules. Based on the determination, the robotic system can derive an optimal placement area for the target object that increases the stacking efficiency and reduces collision likelihoods across multiple placement areas.

To simplify the stacking process, the robotic system can sequence the distinct placement areas. In some embodiments, the robotic system can sequence the distinct placement areas according to distances between the distinct placement areas and an operating robot (e.g., a transfer unit, such as a robot having an arm) configured to place the objects at the distinct placement areas. For example, the robotic system can assign 1 as a sequence identifier to the farthest distinct placement area and higher numbers as sequence identifiers 450 for closer distinct placement areas (e.g., 3 for the closest area out of three placement areas).

The robotic system can use the sequence to generate a simplified rule that can guide the object stacking operation. Continuing with the example sequence above, the robotic system can include a stacking rule to require stack heights at lower sequenced placement areas to be greater than higher sequenced placement areas. This rule can be expressed as $h_i \le h_j$ for $i > j$. Parameters i and j can represent instances of the distinct placement areas, and $h_i$ and $h_j$ can represent the current and/or candidate stack heights at the corresponding distinct placement areas. Details regarding the sequencing and the stacking rule are described below.

By sequencing the placement areas, such as according to a lateral separation distance from the operating robot, the robotic system can simplify the stacking rule. For example, the stacking rule can eliminate multiple situation-based comparisons and corresponding lines of code, memory, and execution time. Based on the simplification, the robotic system can dynamically consider and account for real-world conditions to form more relevant and efficient object stacks. For example, using the simplified rule, the robotic system can group objects having similar footprints together, quickly consider alternative stacking poses of the target object, account for dynamic/unplanned arrival of objects, and more. For comparison, conventional systems may require all objects to be stacked at one location until the resulting stack reaches a limit, and then moving to another placement area. Such methodology may produce undesirable stack formation (e.g., lower stacked objects having smaller lateral dimensions than upper objects), fail to account for dynamic conditions (e.g., unplanned arrival/sequence of objects), and reduce the overall placement efficiency for the target location (e.g., within one pallet).

The robotic system can be configured to dynamically adjust motion plan, placement areas, and/or stacking height limits such as to account for unexpected conditions (e.g., package abnormalities). For example, placing objects may include top surfaces that may be deformed, bent, misaligned, partially closed, and/or otherwise physically different than expected conditions. Such unexpected conditions may affect the ability to stack additional objects at a placement area and/or stacking height limits of other placement areas. The robotic system can detect such unexpected conditions and dynamically adjust the assigned placement areas and/or stacking height limits. Also, based on the dynamic adjustments, the robotic system can update the motion plans to account for the unexpected conditions.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a multi-location placement control mechanism may operate. The robotic system 100 can include and/or communicate with one or more units (e.g., robots) configured to execute one or more tasks. Aspects of the multi-location placement control mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement areas/orientations, sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/ or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a pallet-switching unit for transferring the objects from one pallet to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include and/or be coupled to physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic unit 440s. The sensors can include devices configured to detect or measure one or more physical properties of the robotic system 100 (e.g., a state, a condition, and/or a location of one or more structural members/ joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects on the pallet, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a placement plan, a transfer sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Suitable System

Figure 2:
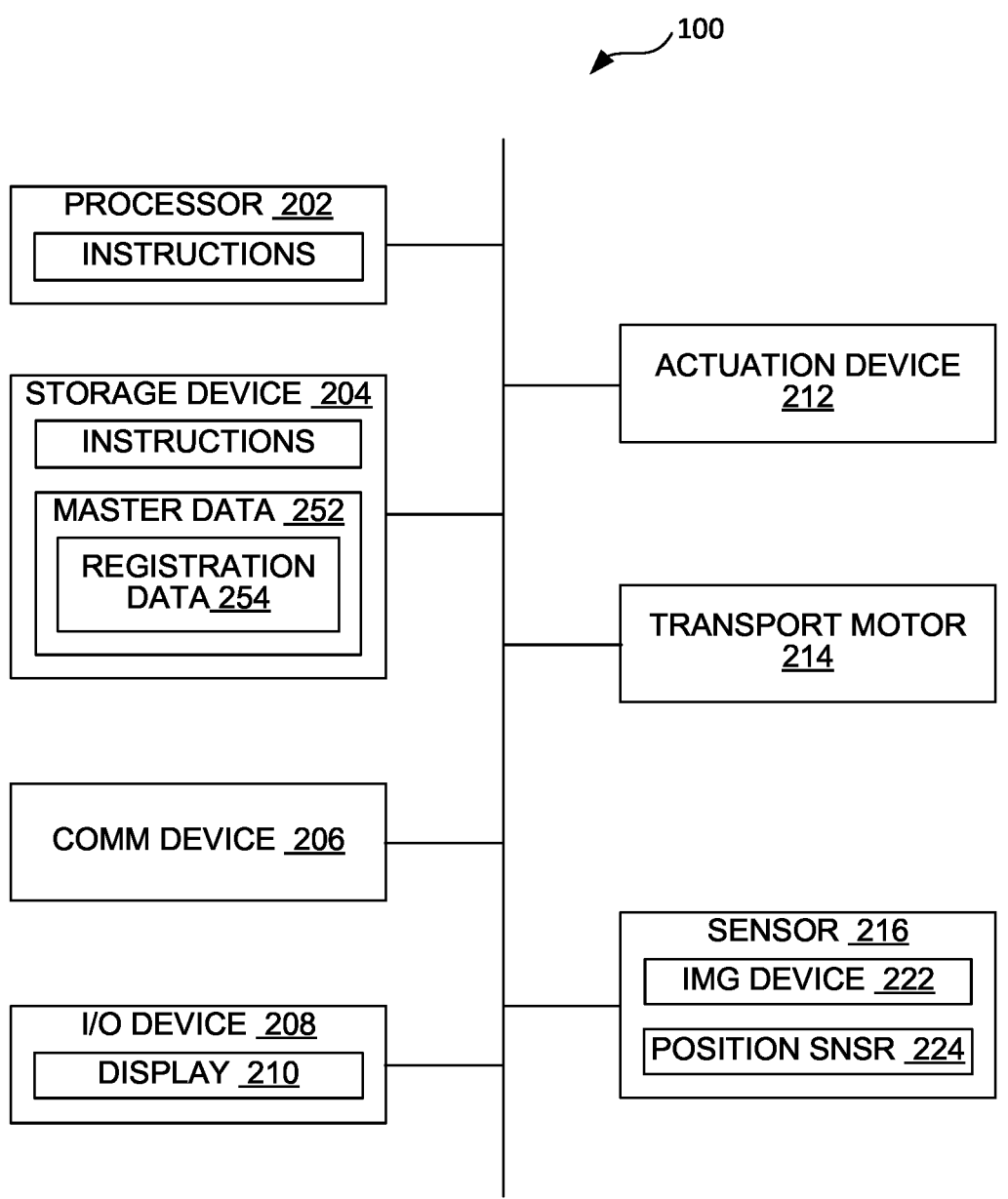
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IOT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic unit 440s illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data 254 for each such object. The registration data 254 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (COM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic unit 440s. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (e.g., via the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects on the pallet, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a placement area, and/or other processing results. Details regarding the dynamic placement algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Example Object Transfer and Placement

Figure 3A:
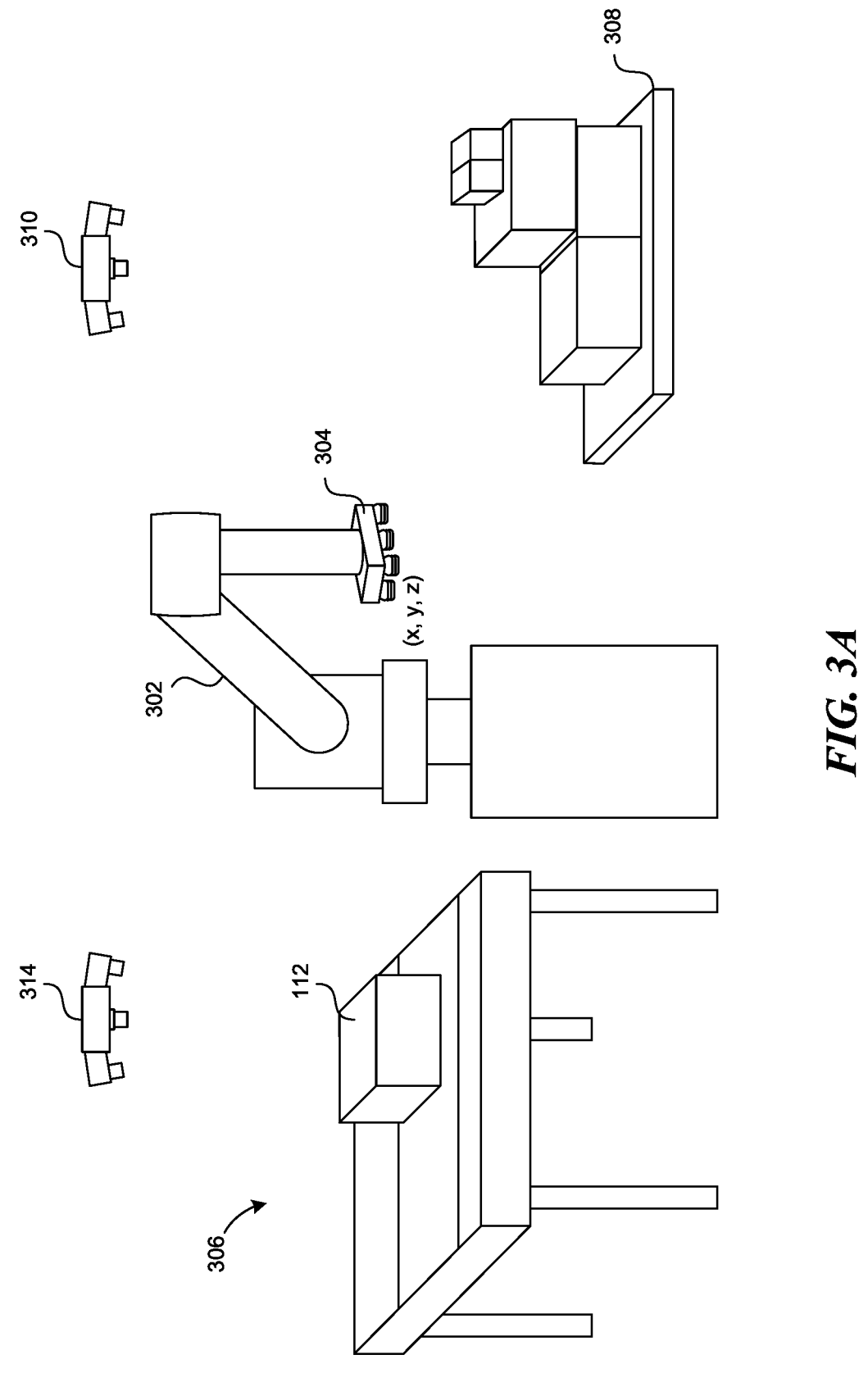
FIG. 3A is an illustration of the robotic system in accordance with one or more embodiments of the present technology.

FIG. 3A is an illustration of the robotic system 100 of FIG. 1 in accordance with one or more embodiments of the present technology. The robotic system 100 can include or be communicatively coupled to a robotic arm 302 that includes an end-effector 304 (e.g., a gripper). The robotic arm 302 can be one of or a part of one of the robotic unit 440s illustrated in FIG. 1 (e.g., an instance of the transfer unit 104 of FIG. 1). For example, the robotic arm 302 can include an industrial robotic system employed in industrial applications including package handling applications. The robotic arm 302 may be articulated along or about a number of axis, such as for six-axis industrial robotic arm structures.

The robotic arm 302 can be configured to transfer the target object 112 between the start location 114 of FIG. 1 and the task location 116 of FIG. 1. As illustrated in FIG. 3A, the start location 114 can correspond to a location (e.g., an end/ingress point) on a conveyor 306 (e.g., an instance of the transport unit 106 of FIG. 1). The task location 116 for the robotic arm 302 can be a placement platform 308 (e.g., a pallet) or a location therein. For example, the robotic arm 302 can be configured to pick the object 112 from the conveyor 306 and place them in/on the placement platform 308 for transport to another destination/task.

The end-effector 304 can include any component or components coupled to a distal end of the robotic arm 302. The end-effector 304 can be configured to interact with one or more objects. In some embodiments, the end-effector 304 can include a force-torque (F-T) sensor (not shown), an arm interface, a gripper system, and/or a gripper interface. For illustrative purposes, the end-effector 304 is shown having rows of suction cups, however it is understood that the end-effector 304 can have a different configuration. For example, the end-effector 304 can have a suction pad with integrated suction channels, a pincher type gripping device, or any other type of gripping system for grabbing objects.

The robotic system 100 can use one or more of the sensors 216 of FIG. 2 in performing the transfer operation with the robotic arm 302. The robotic system 100 can include or be coupled to a set of sensors (e.g., 2D and/or 3D sensors, such as cameras and/or depth sensors) at or about the start location 114 and/or the task location 116. In some embodiments, the robotic system 100 can include or be coupled to a top-view sensor 310 over and directed at the task location 116 and/or a side-view sensor adjacent to and directed laterally toward the task location 116. The robotic system 100 can similarly include one or more source sensors 314 directed to the start location 114. The sensors can be configured to image and/or analyze corresponding locations. For example, the top-view sensor 310 can generate and/or process image data depicting a top-view of the placement platform 308 and/or objects thereon. Also, the side-view sensor can generate and/or process image data depicting a side-view of the placement platform 308 and/or objects thereon.

The robotic system 100 can use the image data from the sensors 216 to perform tasks, such as for transferring the objects from the start location 114 to the task location 116. Accordingly, the robotic system 100 can use the image data to derive and implement one or more placement plans (e.g., a description of the quantity/identity of the objects and/or their poses and physical arrangements on one or more platforms) and/or motion plans (e.g., a description of physically moving a robotic arm to transfer a corresponding object) to perform the tasks. As described in further detail below, the robotic system 100 can derive and/or dynamically adjust placement plans to place objects in multiple stacks on the placement platform 308. The plans can correspond to one or more objects being placed on top of other objects (e.g., stacking).

Figure 3B:
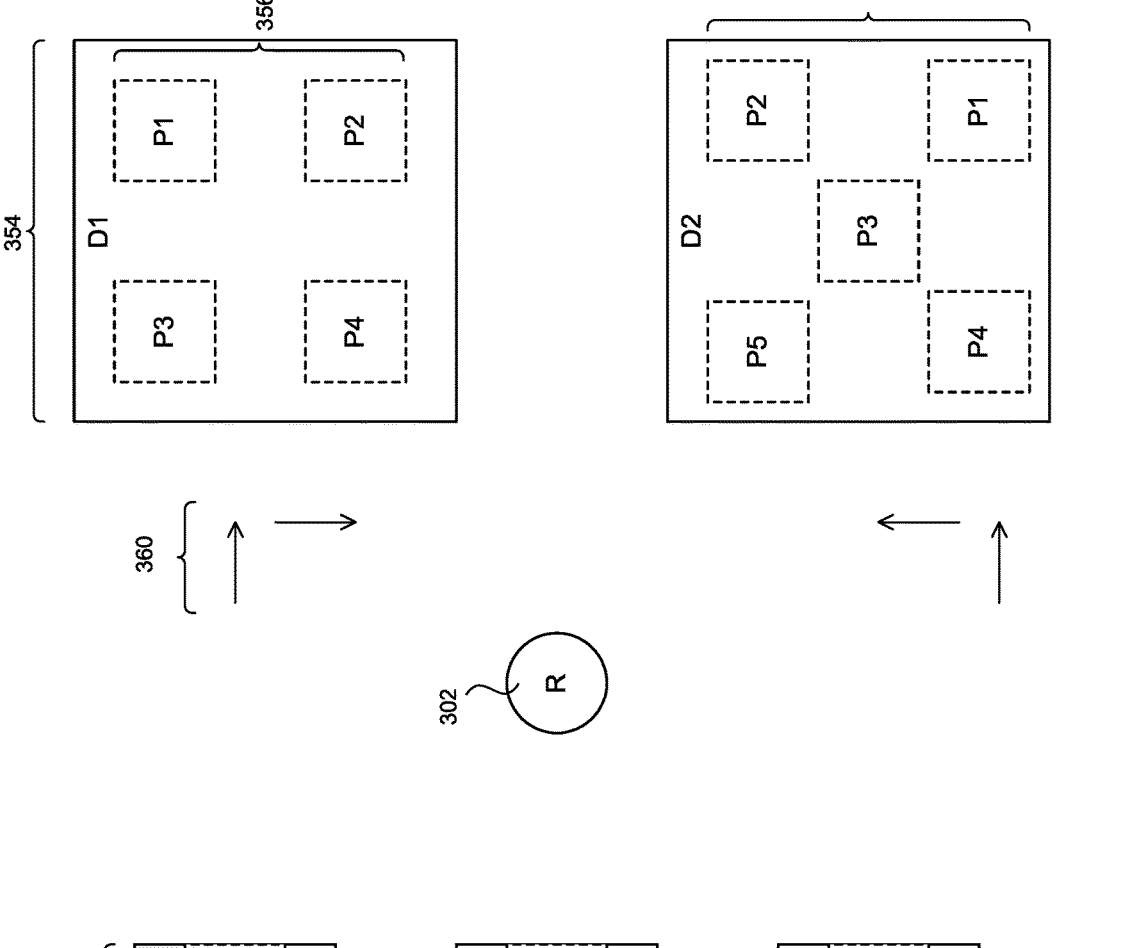
FIG. 3B is an illustration of an example task station for the robotic system in accordance with one or more embodiments of the present technology.

FIG. 3B is an illustration of an example task station 350 for the robotic system 100 of FIG. 1 in accordance with one or more embodiments of the present technology. The example task station 350 can be a location configured for the robotic arm 302 to perform tasks/operations. The example task station 350 can have multiple sources 352, such as separate conveyors, that are configured to separately and/or independently provide targeted objects or packages. The task station 350 can receive the targeted objects through the sources 352, and the robotic arm 302 can transfer the targeted objects to one or more destinations 354 (e.g., pallets).

Each of the destinations 354 can have multiple placement locations 356 (e.g., P1-P4, P1-P5, or the like) for the targeted objects. As described in further detail below, the placement locations 356 can be sequenced or ordered, such as according to a separation distance between the corresponding locations and the robotic arm 302. For the example illustrated in FIG. 3B, the farthest placement location on pallet D1 can be assigned a lowest identifier P1, and the closest placement location can be assigned a highest identifier P4. The robotic system 100 can use the sequence and a corresponding placement rule to select an appropriate placement/stacking location for the incoming objects.

In some embodiments, when the task station 350 includes multiple placement surfaces, the robotic system 100 can assign and utilize a preferred approach direction 360 to each placement surface. For the example illustrated in FIG. 3B, the preferred approach direction 360 for the pallet D1 can effectively correspond to a clockwise direction, and the preferred approach direction 360 for the pallet D2 can correspond to a counterclockwise direction. During motion planning, the robotic system 100 can provide higher weight to following the preferred approach direction 360 when placing objects on the corresponding placement surface. Accordingly, the robotic system 100 can decrease the likelihood of colliding with objects stacked on the other placement surface.

The robotic system 100 can further use the preferred approach direction 360 in sequencing the placement locations 356 within each of the placement surfaces. For example, when two or more placement locations within a given placement surface have separation distances within a threshold range of each other, the robotic system 100 can use the preferred approach direction 360 to sequence such placement locations. The robotic system 100 can assign lower sequence identifiers 450 to placement locations farther along the preferred approach direction 360. Using the example illustrated in FIG. 3B, the robotic system 100 can determine the placement locations P2 and P3 on the pallet D1 as being within the threshold range. Given the clockwise direction for the preferred approach direction 360, the robotic system 100 can assign a lower identifier P2 to the location farther along the preferred approach direction 360. Similarly, the robotic system 100 can sequence P2-P4 for the pallet D2.

Using the sequenced placement locations 356, the robotic system 100 can control the object placement, such as in deriving the packing plan (e.g., locations for objects on the placement surface and within the stacks), selecting which target object to operate on, selecting the placement location for the target object, deriving the motion plan, implementing/executing the motion plan, or a combination thereof. For example, when the (1) arrival timing and availability of targets at the sources 352 are controllable and (2) the targeted content for each platform is available, the robotic system 100 can use the sequence placement locations 356 and the placement rules to derive the packing plans. Also, for example, when (1) the arrival timing is uncontrollable and (2) the targeted content is available, the robotic system 100 can use the sequence placement locations 356 and the placement rules to effectively derive the placement location and derive the packing plan in real-time as objects are received at the sources 352.

Moreover, when the task station 350 includes the multiple sources 352, the robotic system 100 can use the sequence placement locations 356 and the placement rules to select which of the available objects to transfer first. For the example illustrated in FIG. 3B, the robotic system 100 can compare the sequenced placement locations (e.g., such as when placement plans are available or following the dynamic derivation of the placement locations) for targeted objects T1-T3 available at the sources 352. Based on the comparison, the robotic system 100 can select one of the targeted objects having the placement location farthest from the robotic arm 302 and/or complying with other governing rules. Similarly, when an available target object can be placed at two or more placement locations, the robotic system 100 can select one of the placement locations farthest from the robotic arm 302.

Example Placement Area Segmentation

Figure 4A:
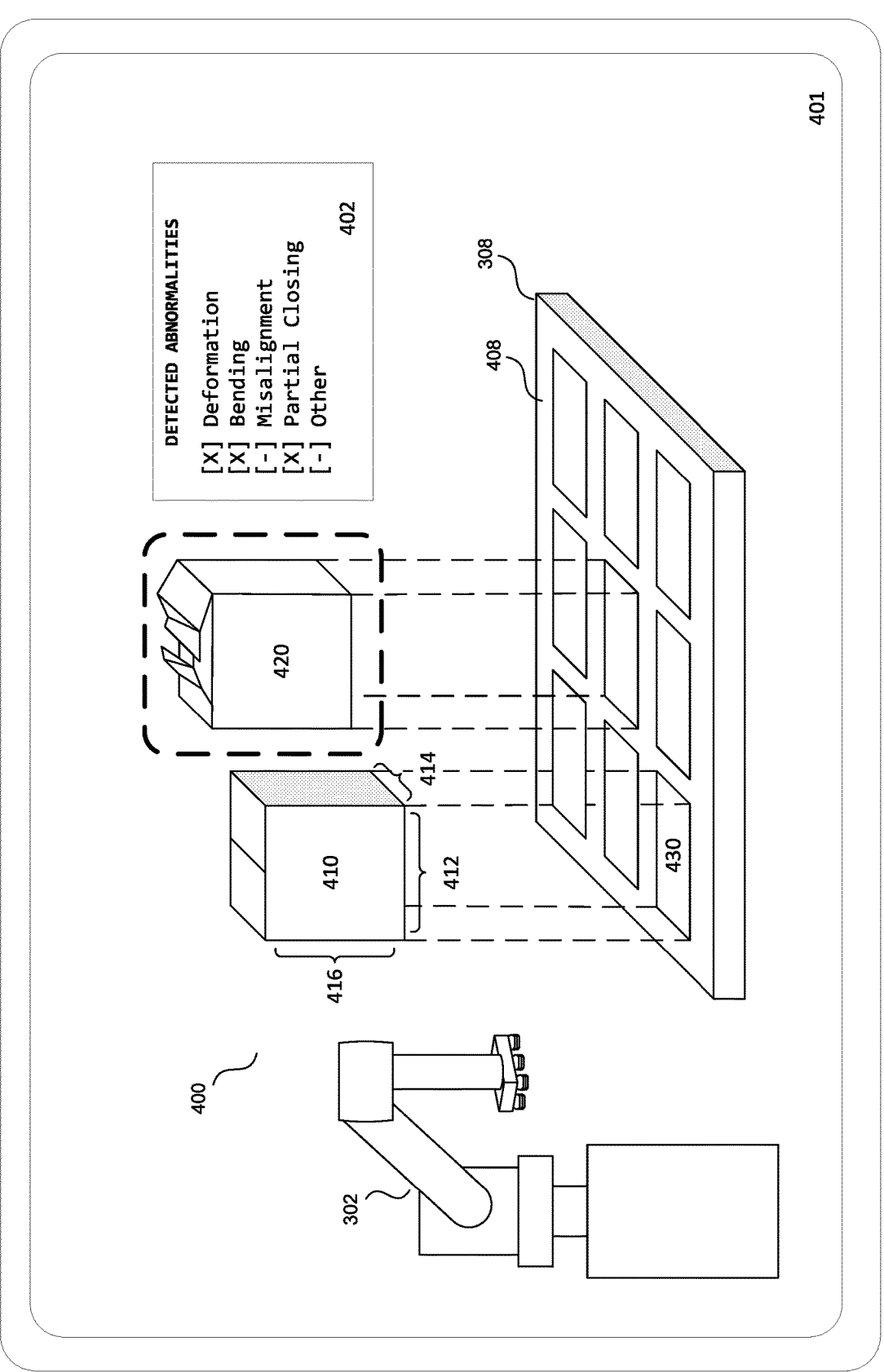
FIGS. 4A-4B are illustrations of example segmentation of placement locations in accordance with one or more embodiments of the present technology.
Figure 4B:
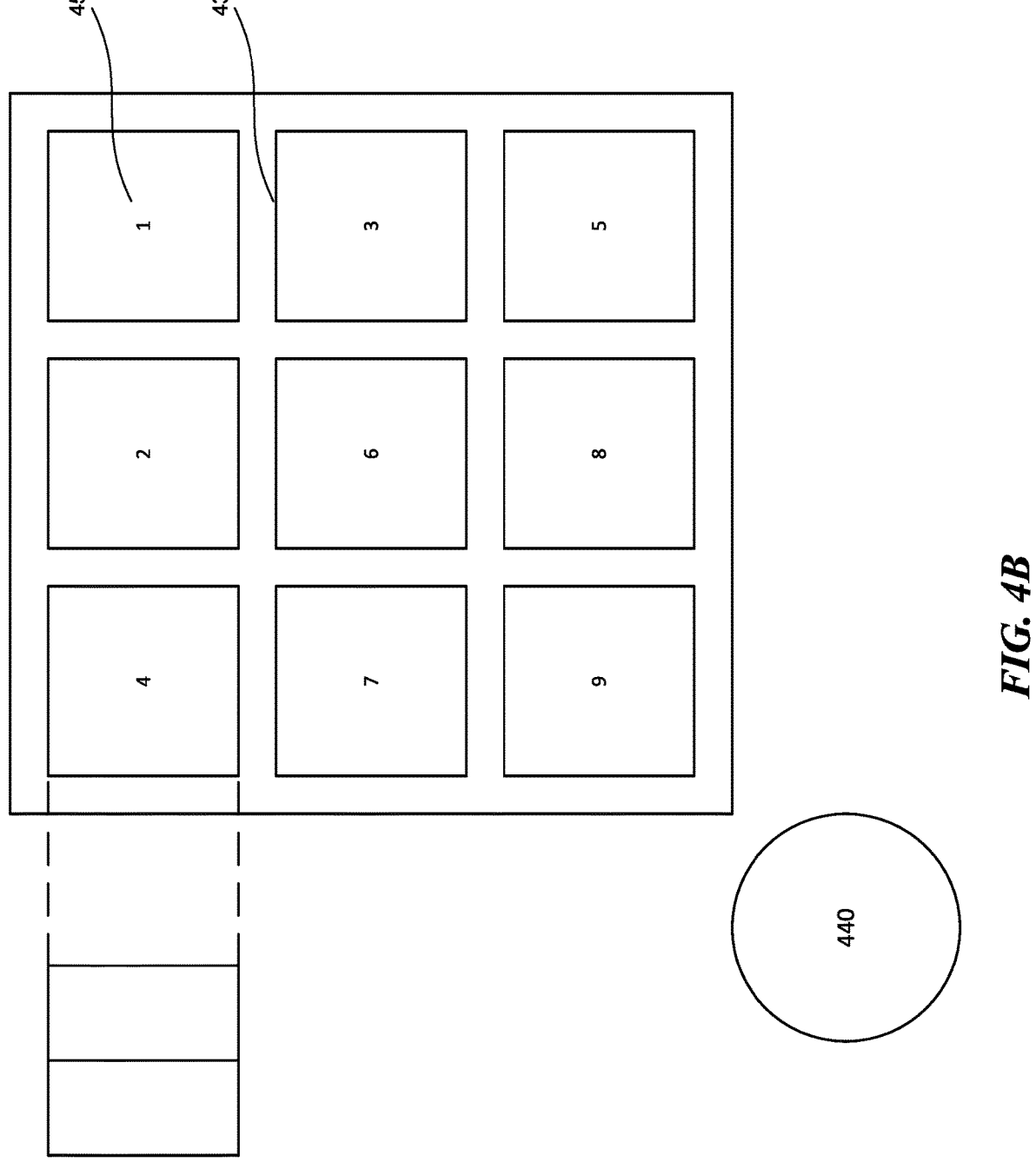

FIGS. 4A-4B are illustrations of example segmentation of placement locations 450 in accordance with one or more embodiments of the present technology. FIG. 4A illustrates an example robotic unit 440 (e.g., a palletizing robot) operating the robotic arm 302 to place a target package 410 on a base surface 408 of the placement platform 308. As illustrated in FIG. 4A, the base surface 408 can be divided into separate placement locations 430. FIG. 4A also shows an example abnormal package 420 with abnormal object properties 402 (e.g., deformed top surface) that interferes (e.g., prevents additional stacking of packages on top) with the robotic system 100. FIG. 4A illustrates an electronic display 401 that depicts the robotic unit 440, the robotic arm 302, the placement platform 308, the target package 410, and the abnormal package 420. FIG. 4A also shows a pop-up display that identifies the abnormal object properties 402 (e.g., one or more physical properties of the detected object deviating from a known corresponding measure) of the abnormal package 420. FIG. 4B is a side-view of the example placement assembly 400.

In some embodiments, the robotic system 100 of FIG. 1 can be configured to form multiple stacks on one or more placement platforms 308 using the robotic unit 440. For example, the robotic system 100 can use one palletizing robot (e.g., one station) to form multiple stacks one pallet or multiple pallets. Such multi-stack configurations and implementations can be used to fulfill multiple tasks and/or complex tasks, such as for fulfilling multiple orders (e.g., with each pallet representing an order) and/or for placing a set of mixed stock keeping units (SKU) or item types on one or more of the platforms.

In fulfilling the multiple and/or complex tasks, the robotic system 100 can form multiple separate stacks on one or more of the one or more placement platforms 308. Accordingly, the robotic system 100 can divide the base surface 408 of the corresponding placement platform 308 into the multiple placement areas. Each placement area can represent a site or a location for a corresponding object stack. In some embodiments, the robotic system 100 can dynamically divide the base surface 408 and compute the placement areas according to objects that are incoming or accessible in real-time. In other embodiments, the robotic system 100 can use a packing planner (e.g., a dedicated set of processors, engine, software, or a combination thereof) to divide the base surface 408 according to one or more predetermined goals (e.g., the packing density, the pallet height limitation, the shipping manifest, related thresholds or rules, or a combination thereof). The robotic unit 440 can receive incoming objects from one or more sources (e.g., conveyors) and transfer each of the target package to one of the placement areas, thereby forming multiple stacks of objects on one or more of the pallets.

In forming and managing multiple stacks, the robotic system 100 can detect or recognize the objects using one or more sensor data. For example, the robotic system 100 can receive image data (e.g., 2D image, 3D depth map, or a combination thereof) from the source sensors 314 of FIG. 3A or other similar sensors 216 of FIG. 2 depicting the start location 114 of FIG. 1 (e.g., one or more conveyors 306 providing the objects to the station). The robotic system 100 can analyze the image data in real-time to determine one or more physical characteristics of the received target package 410, sch as dimensions (e.g. length, width, or height), shapes, outlines, texture (e.g., images, writings, or other visual characteristics of the object surface(s)), object pose, and/or other physical properties of the target package 410 and the placement platform 308. In some embodiments, for example, the robotic system 100 can use depth measures (e.g., point cloud data) from one or more imaging devices 222 of FIG. 2. Since a vertical position of the ground and/or the placement platform 308 is known (e.g., a height of the top surface of the placement platform), the robotic system 100 can use the depth measures to calculate the heights/contour of the exposed top surface(s) of the platform 308 and the target package 410. Additionally or alternatively, the robotic system 100 can compare one or more physical characteristics (e.g., sensor data, such as object texture or dimensions) to the masters data to detect or recognize the received object. Moreover, the robotic system 100 can detect the object by determining the location of the object, the physical edges/boundaries of the object, or a combination thereof.

In generating or adjusting the packing plan for each platform, the robotic system 100 can use the lateral dimensions (e.g., length, width) of expected or available packages to divide the platform's base surface and compute the placement locations 430. Given the expected or intended packing targets (via, e.g., upstream sensor information, shipping manifest, etc.), the robotic system 100 can determine a stacking pose and a corresponding base area (e.g., footprint). Using the base area of the packing targets, the robotic system 100 can determine one or more placement locations 430 on of the placement platform 308 by dividing the base surface of the placement platform 308 into one or more perimeters associated with the base area of the packing targets. The placement locations 430 can represent locations on the placement platform 308 on which one or more package objects can be placed and/or stacked. The robotic system 100 can also assign sequence identifiers 450 to each placement location. In some embodiments, the length 412 and/or width 414 of the packing targets 410 can be fixed to a specific distance. Thus, the robotic system 100 can divide the base area of the placement platform into equal-sized perimeters corresponding to each placement location 430. The robotic system 100 can determine placement locations 430 by a three-dimensional coordinate center, a set of known distances (e.g., number of pixels from the edges of the placement platform 308), a set of perimeter vectors (e.g., pairs of coordinates), or some combination thereof.

In some embodiments, the robotic system 100 can determine one or more sets of placement locations 430 for differing height levels above the placement platform 308. The robotic system 100 can be configured to determine a placement location 430 that does not overlap the perimeter of another placement location 430 on the same lateral height level.

The robotic system 100 can be configured to determine lateral distances between placement locations 430 and the robotic unit 440. In some embodiments, the robotic system 100 can calculate a distance from a reference point (e.g., center portion) of the placement location 430 to a reference point (e.g., center portion) of the robotic unit 440 lateral (e.g., x-y plane) to the center point of the placement location 430. The robotic system 100 can be further configured to arrange or assign the sequence identifiers 450 to the placement locations 430 according to a sequence ordered based on the calculated distance, such as for assigning the lowest identifier to the farthest placement location and higher identifiers to closer placement locations.

The robotic system 100 can be configured to identify the abnormal object properties 402 associated with objects that are incoming or are accessible in real-time. For example, the robotic system 100 can be configured to identify deviations in one or more physical traits (e.g., deformation, bending, misalignment, and/or partial closing, etc.) of an incoming object that prevents stacking of additional objects on top of the incoming object. The robotic system 100 can detect the incoming object using one or more portions (e.g., portions of a top surface of the package or lateral dimensions) depicted in the image data. Following the detection, the robotic system 100 can compare one or more physical traits, such as one or more dimensions, center/overlap region, top surface orientation or outline shape, or the like, to the master data. In some embodiments, the robotic system 100 can include the predetermined one or more physical traits and the corresponding analysis processes associated with known deviations. In some embodiments, the robotic system 100 can adjust the stacking height limit 530 based on the identified abnormal object properties of incoming objects.
Placement Rules FIGS. 5A-5F are illustrations of implementation of placement rules in accordance with one or more embodiments of the present technology. FIGS. 5A-5F illustrate various stacking scenarios that correspond to the various placement rules. The robotic system 100 may use the placement rules to derive placement locations of objects within the designated placement platform 308. For example, the robotic system 100 may discard or disqualify potential placement locations 430 that fail to satisfy one or more placement rules.

Figures 5A, 5B, 5C, 5D, 5E, 5F:
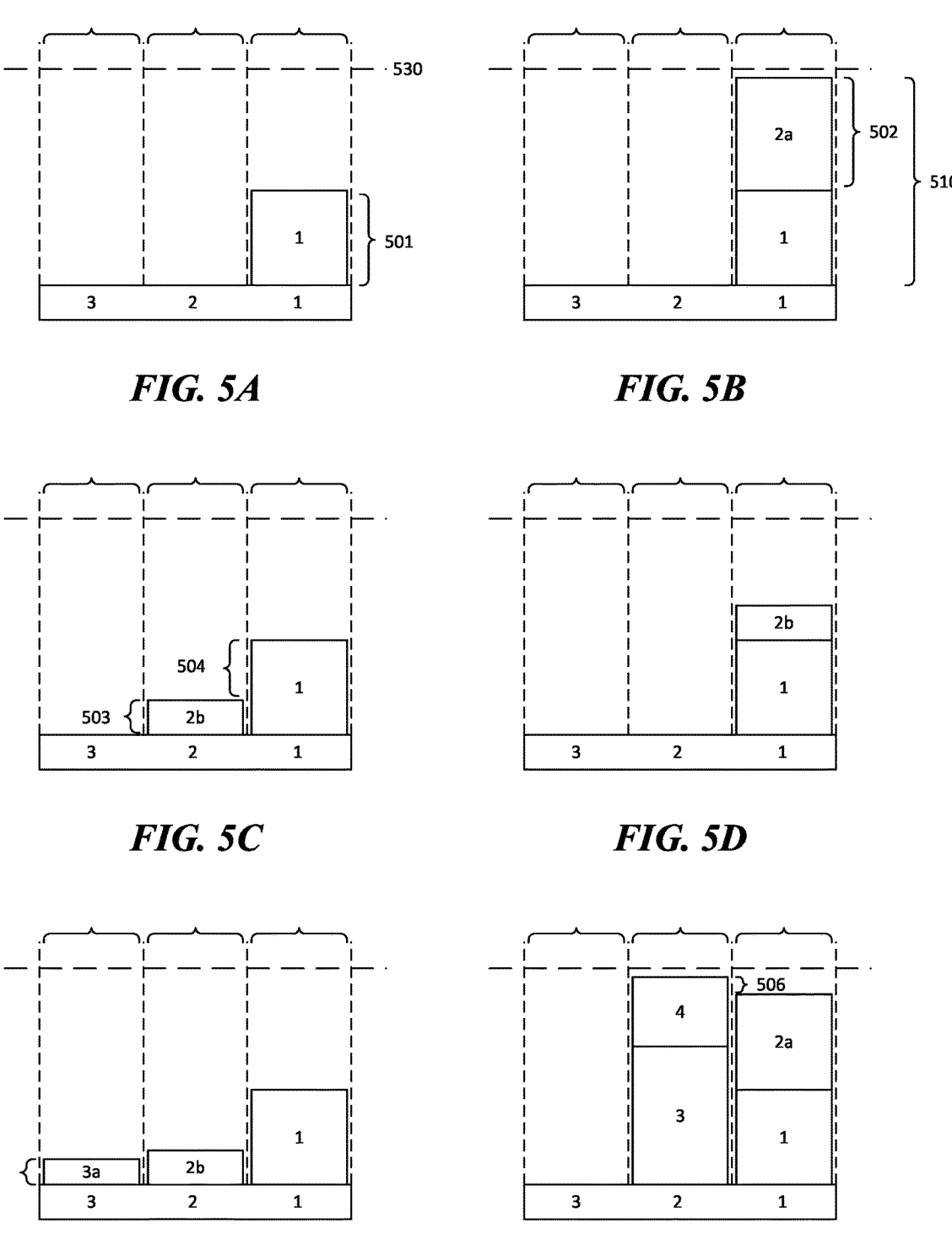
FIGS. 5A-5F are illustrations of implementation of placement rules in accordance with one or more embodiments of the present technology.

Some instances of the placement rules can be for placing objects on top of each other, such as for stacking/placing one or more layers of packages above one or more other layer(s) of packages. The robotic system 100 can use the placement rules for improving/ensuring stability of the stacked objects and prevent any objects from slipping and/or tipping during movement of the placement platform 308. Further, the robotic system 100 can use the placement rules to increase the overall number of packed items while reducing likely collisions in placing such items. FIG. 5A shows the final state after placing a first item and the initial state for placing a second item. For illustrative purposes, FIG. 5B, FIG. 5D, and FIG. 5F show multiple scenarios of a top package directly above and supported by (e.g., directly contacting) one or more support packages. FIGS. 5B-5D illustrate multiple packing scenarios for placing the second item from the initial state shown in FIG. 5A according to different packing dimensions. FIG. 5E shows an alternative stacking possibility for the first three items that reducing the differences in heights at the placement locations. FIG. 5F shows a stacking possibility that deviates from the pattern shown in FIGS. 5B-5E.

The robotic system 100 can be configured to determine a target placement location for a target package 410. The robotic system 100 can use a current stack height 510 of a placement location 430 to derive the target placement location. In some embodiments the robotic system 100 can determine the current stack height 510 of stacked packages on a placement location 430 in real-time. The robotic system 100 can use the imaging devices 222 to analyze a depth measure (e.g., point cloud data) between the top surface of the stacked packages and the placement platform 308. In some embodiments, the robotic system 100 can access recorded height information for each stacked package on the placement location 430 from the master data 252. Thus, the robotic system 100 can determine the current stack height 510 of the placement location 430 by summation of the recorded height information for each stacked package.

When determining an appropriate placement location for a target package 410, the robotic system 100 can determine a combined stacking height of a placement location 430 as a summation between the current stacking height 510 of the placement location 430 and height 416 of the target package 410. In other words, the robotic system 100 can determine the combined stacking height as a height that would result if the target package 410 is placed at a corresponding placement location (e.g., stacked on top of previously placed packages at the corresponding location).

The robotic system 100 can use a placement rule to derive a target placement location 430 for the target package 410. The placement rule can include a regulation, a requirement, or a combination thereof for controlling or qualifying current stacking heights 510 between the placement locations 430. For example, the placement rule can be based on a height requirement, a sequence requirement, or a combination thereof.

The height requirement can include a maximum stacking height limit 530 (e.g., a percentage relative to dimensions of the placement platform or a static distance) for the current stacking heights 510 of the placement locations 430. In some embodiments, the height requirement can be a requirement controlling the relative heights between adjacent stacks. In other words, the height requirement can require that the current stacking height 510 of a placement location 430 is within a predetermined range from the current stacking heights 510 of other placement locations.

The sequence requirement can require that a stacking height according to a predetermined sequence or order of the placement locations. For example, the sequence requirement can require the stacking height of a first placement location to be greater than a stacking height of a second placement location if the identifier for the first placement location is before or lower than the identifier for the second placement location in sequence. In some embodiments, the sequence requirement can be illustrated by the relationship $h_i \le h_j$ for i>j, wherein $h_i$ and $h_j$ represent the current stacking heights of the first and second placement locations and i and j represent the sequence identifiers 450 for the first and second placement locations respectively. As described above, the placement locations can be sequenced or ordered according to a distance between the corresponding placement locations and the robotic unit 440.

In some embodiments, the robotic system 100 can use a stacking height limit 530 to derive the target placement location 430 for the package 410. The stacking height limit 530 can be a predetermined maximum limiting the current stacking heights 510 of the placement locations 430. In some embodiments, the robotic system 100 can deviate from the placement rule and follow an exception rule. For example, the robotic system 100 can stack a target package 410 at a first placement location that is closer to the robot unit than a second placement location 430, the total height of the first placement location being greater than the current stacking height of the second placement location, when the total height of the second placement location exceeds the stacking height limit. The robotic system 100 can determine the stacking height limit 530 according to a user input (e.g., a customer-specified requirement), a carrier dimension, a robotic feature (e.g., a maximum accessible height for a robotic unit 440 for one or more placement locations), or the like.

In determining the target placement location 430 for the target package 410, the robotic system 100 can determine whether the target package 410 can be placed at a select placement location based on the current stacking heights and the sequence identifiers 450 corresponding to the placement locations 430. For example, the robotic system 100 can determine the combined stacking height of the select placement location to compare with the current stacking heights of the placement locations 430 available on the placement platform 308. Additionally, the robotic system 100 can determine the sequence identifier of the select placement location to compare with the sequence identifiers 450 of the placement locations 430. Using the combined stacking height, current stacking heights, and sequence identifiers 450, the robotic system 100 can iteratively compare the combined stacking height and the sequence identifier of the select placement location with the current stacking heights and the sequence identifiers 450 of the placement locations 430 to determine if the select placement location is compliant with at least either the placement rule or the exception rule. The robotic system 100 can determine that the target package 410 can be placed at the select placement location when the select placement location is compliant with the placement rule, the exception rule, or both. The robotic system 100 can eliminate the placement location when the location fails to satisfy one or more of the rules.

In some embodiments, the robotic system 100 can iteratively compare the select placement location with the placement locations 430 starting from a first placement location closest to the robot unit (e.g., sequence identifier with largest value) and sequentially following the order of sequence identifiers 450 until ending at a last placement location farthest from the robot unit. The robotic system 100 may select a first valid select placement location as the target placement location 430 for the target package 410. In other embodiments, the robotic system 100 can repeatedly select the target placement location of a previous selection of the target placement location for the target package 410 until either the placement rule or the exception rule is violated. In repeatedly selecting the target placement location of the previous selection, the robotic system 100 can skip comparison between the select placement location and the placement locations 430.

As an illustrative example, FIG. 5A illustrates a point in time where one package has been placed on a pallet with three placement locations. Before placing the package, the heights at the three placement locations would have been zero. As such, the robotic system 100 can select the farthest placement location (e.g., identifier 1 with the robotic unit 440 located on the left side of the pallet) to place the package. After placing the target, the current height 501 at identifier 1 can correspond to the height (e.g., h1) of the placed package (e.g., package 1).

FIG. 5B illustrates a placement of a second package (e.g., package 2a) having a height 502 that is greater than or equal to the first package height 501. In considering the placement location for the second package, the robotic system 100 can calculate the combined stacking heights for placement location 1 (e.g., h1+h2a) and placement location 2 (e.g., h2a). The robotic system 100 can use the resulting combined stacking heights for the candidate locations to compare against the rules. Since h2a≥h1, the combined height resulting from placing the second package at location 2 would be greater than the current height of location 1, thereby violating the placement rule. Alternatively, the combined height at location 1 would maintain the height of the farther stack to be higher than the nearer locations and maintain the combined height lower than the maximum stack height, thus adhering to the placement rule. Moreover, the robotic system 100 can ignore the exception rule since the combined heights for both candidate locations remain under the maximum stack height.

FIGS. 5C and 5D illustrate different placement possibilities for a different second package (e.g., package 2b) having a height lesser 503 than the first package height 501. FIG. 5C can illustrate the second package 2b placed at location 2, and FIG. 5D can illustrate the second package 2b placed at location 1 and stacked on top of the first package 1. The robotic system 100 can calculate the combined heights for both candidate placements and assess according to the rules. Since the height $2b$ for the second package $2b$ is less than the height $h1$ of the first package, the subtracting height $2b$ from height $1$ can provide a positive number 504. Accordingly, the robotic system 100 can determine that placing the second package $2b$ at the second location satisfies the placement rule. Further, the robotic system 100 can determine that placing the second package $2b$ at the first location also satisfies the placement rule and maintain the height below the maximum threshold. When the robotic system 100 identifies multiple valid placement possibilities, the robotic system 100 can use one or more predetermined processes to select between the valid possible locations. For example, the robotic system 100 can have a predetermined rule to select the further location first and increasing the highest stack height or spreading out the placements to reduce the differences in height between the stacks. FIG. 5E illustrates a transition from FIG. 5C in placing a third package $3a$ according to the preference for reducing the differences in heights at the placement locations.

In other embodiments, the robotic system 100 can generate a packing plan using a separate subsystem (e.g., a planner). For example, when the total content of a pallet is known, such as according to an order or a shipping manifest, the robotic system 100 can compute the packing plan (e.g., designated locations for each package in the content) before placement of the packages. In such situations, the robotic system 100 can consider the different placement scenarios during the planning stage. During the placement stage, the robotic system 100 can follow the stacking plan instead of evaluating the different placement possibilities. Further during the placement stage, the robotic system 100 can use the various rules to consider out-of-sequence arrival of packages at the start location or for packages having multiple placement locations within the stack. Additionally or alternatively, the robotic system 100 can use the placement rules to generate a stacking sequence during the pack planning stage.

FIG. 5F illustrates the exception rule. FIG. 5F can represent the stacking sequence following FIG. 5B. For example, after stacking the second package (identifier $2a$) at location 1, the robotic system 100 can place the third package (identifier 3) at location 2 since stacking the third package 3 at location 1 would generate the combined height exceeding the maximum stack height. Moreover, the robotic system 100 can eliminate location 3 as a possibility for the third package since the corresponding combined height would exceed the current height of location 2 and violate the placement rule. Subsequently, in evaluating the placement location for fourth package (identifier 4), the robotic system 100 can determine that a remaining height 506 (e.g., a difference between the current height and the stacking height limit 530) at location 1 is less than a smallest dimension of known or available objects. In response, the robotic system 100 can effectively eliminate location 1 by indicating that the location is filled. Accordingly, the robotic system 100 can invoke the exception rule and select location 2 with the combined height at location 2 exceeding the current height of location 1. Otherwise, such as when the remaining height at location 1 is greater than one or more dimensions of possible or anticipated package, the robotic system 100 can select location 3 as the placement location for package 4. In other embodiments, the robotic system 100 can invoke the exception rule when the remaining height 506 is within a height threshold.

Example Placement Sequence

Figure 3B:
Figure 6A:
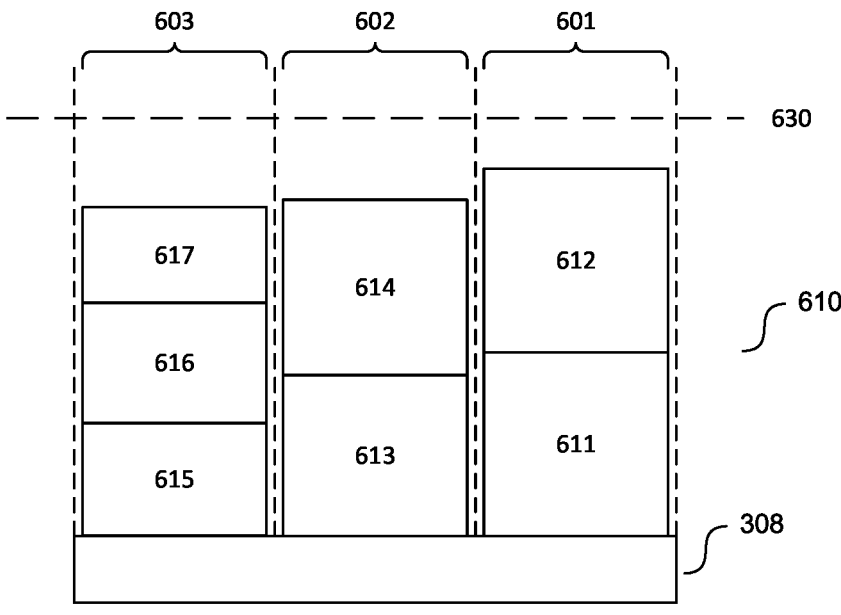
FIGS. 6A-6B are illustrations of example placement sequences in accordance with one or more embodiments of the present technology.
Figure 6B:
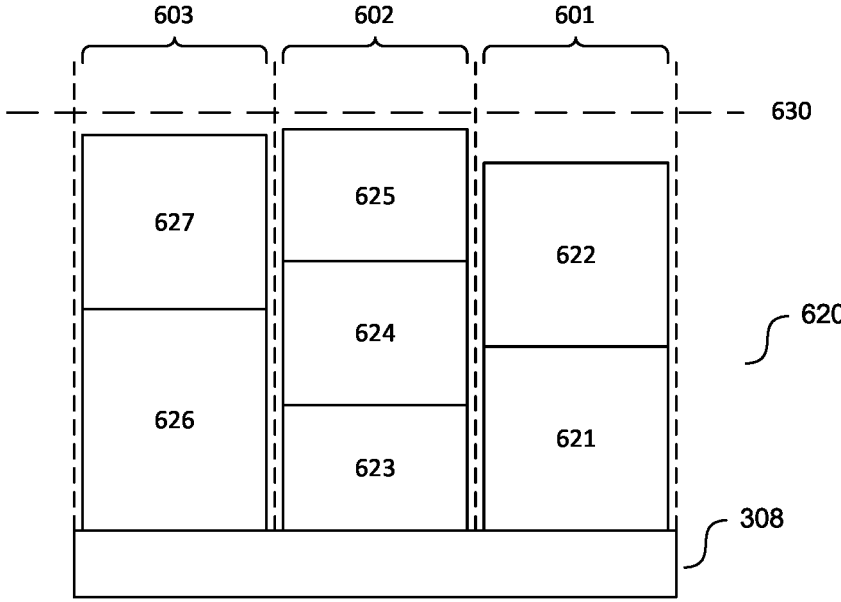

FIGS. 6A-6B are illustrations of a first example placement sequence and a second example placement sequence in accordance with one or more embodiments of the present technology. The robotic system 100 can use the placement rule and/or the exception rule to derive the first 610 and the second 620 placement sequences for placing a set of objects on the derived placement locations 601-603 of the placement platform 308 of FIG. 3 (e.g., a pallet). The first placement location 601 can be located farthest from the robot unit and the third placement location 603 can be located closest to the robot unit. The first 610 and the second 620 placement sequences correspond to side-views that represent vertical occupancies of objects placed on the placement platform 308.

For the first example placement sequence 610 illustrated in FIG. 6A, the first set of targeted objects 611-617 are designated to be placed onto the placement platform 308 in the placement locations 601-603. Accordingly, the robotic system can derive the placement sequence 610 using the placement rule. The robotic system 100 can begin the placement sequence 610 by placing a first target object 611 to the first placement location 601 farthest from the robot unit according to the placement rule. Subsequently, the second target object 612 can be placed on the first placement location 601 directly above the first target object 611. In other embodiments, the robotic system 100 can place the second target object 612 in the second placement location 602, as the vertical height of the second target object 612 is less than the vertical height of the first target object 611. When the robotic system 100 identifies multiple valid placement possibilities, the robotic system 100 can use one or more predetermined processes to select between the valid possible locations. For example, sequence 610 illustrates the robotic system 100 following a predetermined rule to select the further location first and increasing the highest stack height.

The third target object 613 can be placed on the second placement location 602 as the combined vertical height of the first three target objects would exceed the stacking height limit 630. The fourth target object 614 can be placed on the second placement location 602, as the combined vertical height of the third 613 and the fourth 614 target objects would be within the stacking height limit 630. In other embodiments, the robotic system 100 can place the fourth target on the third placement location 603 since the height of the fourth target object is less than the stacking height on placement location 602. Similar to the placement of the second target object 612, the robotic system 100 can follow a predetermined rule to select the further location first and increase the highest stack height. In other embodiments, the robotic system 100 can use one or more alternative predetermined processes to select between multiple valid possible locations for the fourth placement object.

The fifth target object 615 can be placed on the third placement location 603, as placing the fifth target object 615 on either the first 601 or second 602 placement locations would result in the combined stacking height exceeding the stacking height limit 630, thus violating the placement rule. Likewise, the sixth 616 and seventh 617 target objects can be placed in the third placement location 603 since their object heights would be greater than the height difference between the stacking height limit 630 and the current stacking heights at placement locations 602 and 603.

For the second example placement sequence 620 illustrated in FIG. 6B, the second set of targeted objects 621-627 are designated to be placed onto the placement platform 308 in the placement locations 601-603. Accordingly, the robotic system can derive the placement sequence 620 using the placement rule and the exception rule. The robotic system 100 begins the placement sequence 620 by placing a first target object 621 to the first placement location 601 farthest from the robot unit. Subsequently, the second target object 622 is also placed on the first placement location 601 directly above the first target object 621. In other embodiments, the robotic system 100 can place the second target object 622 in the second placement location 602, as the vertical height of the second target object 622 is equivalent to the vertical height of the first target object 621.

The third target object 623 must be placed on the second placement location 602 as the combined vertical height of the first three target objects would exceed the stacking height limit 630. The fourth target object 624 is placed on the second placement location 602. In other embodiments, the robotic system 100 can place the fourth target object 624 in the third placement location 603, as the vertical height of the third 623 and the fourth 624 target objects are equivalent. The fifth target object 625 is placed on the second placement location 602 above the fourth target object 624. Thus, the combined stacking height of the second placement location 602 exceeds the combined stacking height of the first placement location 601 and violates the placement rule. Instead, the robotic system 100 can use the exception rule to allow placement of the fifth target 625 on the second placement location 602. Subsequently, the sixth 616 and seventh 617 target objects are placed in the third placement location 603.

Example System Operation

FIG. 7 is a flow diagram for an example method 700 of operating the robotic system of FIG. 1 in accordance with one or more embodiments of the present technology. The method 700 can be for deriving the target placement location 430 for placing the target package 410 onto the placement platform 308. The method 700 can be implemented based on executing the instructions stored on one or more of the storage devices 204 of FIG. 2 with one or more of the processors 202 of FIG. 2. The processors 202 can control the robotic arm 302 of FIG. 3A and/or the end effector 304 of FIG. 3A, such as in transferring the target object 112 of FIG. 1 from the start location 114 of FIG. 1 to the pallet at the task location 116 of FIG. 1. For example, the processors 202 can send commands, settings, and/or other communications that effectively control the robotic unit 440s to maneuver the components/objects and place them at the corresponding placement locations on the pallet.

At block 702, the robotic system 100 can identify one or more objects (e.g., target package 410 of FIG. 4A) designated for placement on pallets at the task location 116. For example, the robotic system 100 can identify objects that are available for packing, within an inbound shipment, arriving at a designated location, located at a source, designated for placement, and/or listed in an order/request/manifest.

Also, at block 702, the robotic system 100 can identify the pallet available to receive and stack the identified objects. For example, the robotic system 100 can identify the placement platform 308 available to receive and stack the identified objects. Also, the robotic system 100 can determine characteristics/traits (e.g., categories, dimensions, identifiers, etc.) for the identified placement platform 308. The robotic system 100 can also determine the base surface of the placement platform 308 for placing and/or stacking the identified objects. The robotic system 100 can interface with another system (e.g., transport robot system), access information from the master data 252 of FIG. 2, and/or obtain real-time information from the placement platform 308 (via, e.g., sensors at predetermined locations) to identify the placement platform 308 and/or their characteristics.

At block 704, the robotic system 100 can obtain (e.g., by generating in real-time and/or accessing from the master data 252 of FIG. 2) physical properties (e.g., dimensions, shape, abnormalities) of the identified objects. For example, the robotic system 100 can obtain physical properties representing the length, the width, and/or the height of each identified object, such as the target package 410 of FIG. 4A. The robotic system 100 can also group the identified objects into one or more sets of identified objects based on similar dimensions (e.g., length and/or width). Also, the robotic system 100 can obtain information on abnormal physical features of each identified object. In some embodiments, the robotic system 100 can determine the physical properties of identified objects in real-time (e.g., after receiving the order and/or prior to beginning the placement operation, or offline) based on image data and/or depth measures (e.g., cloud point) received from imaging sensors. In some embodiments, the robotic system 100 can assess whether the abnormal object properties prevent additional stacking on top of the target package 410. Accordingly, the robotic system 100 can adjust the stacking height limit 530 based on the assessment.

At block 706, the robotic system 100 can determine the stacking pose and corresponding lateral base area (e.g., footprint) of the intended packing targets. For example, the robotic system 100 can determine the stacking pose of the target package 410 selected from the identified objects. Using recorded physical dimensions (e.g., length and/or width) of the target package 410, the robotic system 100 can form the lateral base area (e.g., by forming a perimeter of edges around the base surface of the intended packing target and/or by rotating shape templates included in the master data 252) for the target package 410. In some embodiments, the robotic system 100 can fix the lateral dimensions (e.g., length and width) of the intended packing targets to a constant value. Thus, the robotic system 100 can assign a fixed lateral base area for each intended packing target after calculating the lateral base area once.

At block 708, the robotic system 100 can determine the placement locations 430 for stacking the intended packing objects on the placement platform 308. For example, the robotic system 100 can divide the base surface of the placement platform 308 into one or more distinct placement areas (e.g., bounded areas on the base surface of the placement platform 308 for stacking packages) using the lateral base areas to define bounding perimeters of the distinct placement areas. For each distinct placement area, the robotic system 100 can define a new placement location and determine characteristics/traits (e.g., spatial location, dimensions, height relative to the base surface of the placement platform 308) of the new placement locations 430. In other embodiments, the robotic system 100 can access one or more predetermined placement locations for an order, a pallet, a set of items, or a combination thereof corresponding to the current task.

In determining placement location for targeted packing objects, the robotic system 100 can determine a candidate sequence of placement locations 430 (e.g., a priority stacking order) by assigning a sequence identifier (e.g., an identification number) to each placement location 430 based on a distance measurement (e.g., proximity to a location and/or object). For example, the robotic system 100 can identify a lateral (e.g., x-y plane) reference for calculating the distance measurement of the placement locations 430. In some embodiments, the lateral reference can be a location of the robotic unit 440 (e.g., base of the robot arm) lateral to the base surface of the placement platform 308 and/or the placement location 430.

At block 722, the robotic system 100 can compute placement location 430 distances from the robot unit. For example, the robotic system 100 can determine a distance between each placement location 430 (e.g., coordinate center of the placement area perimeter) and the robotic unit 440 (e.g., unit center coordinates) lateral to the placement location 430 and/or the placement platform 308. In some embodiments, the robotic system 100 can use a predetermined configuration (e.g. pre-recorded location data) of the robot unit in computing separation distance between the robot unit and the placement location 430.

At block 724, the robotic system 100 can generate sequence identifiers 450 corresponding to placement locations 430 based on the placement location 430 distances from the robot unit. The sequence identifiers 450 (e.g., an order of identification numbers) represents an ordering of placement locations 430. For example, the robotic system can assign sequence identifiers 450 in ascending order based on placement location 430 distances in descending magnitude. Thus, the first/lowest sequence identifier is assigned to a placement location 430 farthest from the robot unit and the last/highest sequence identifier is assigned to a placement location 430 nearest to the robot unit.

At block 710, the robotic system 100 can determine the target placement location 430 for the target package 410 selected from the intended packing targets. For example, the robotic system 100 can assign the target package 410 to a sequence identifier corresponding to the target placement location 430. The robotic system 100 can select the target placement location 430 using characteristic information/traits (e.g. location, dimensions, shape) of the placement locations 430 on the placement platform 308. The robotic system 100 can use the characteristic information to determine the current stacking heights and the combined stacking heights of the placement locations 430. Using the current stacking heights and the combined stacking heights, the robotic system 100 can determine candidate locations comprising of placement locations 430 that comply with either the placement rule or the exception rule. The robotic system 100 can select a best candidate location from the candidate locations as the target placement location 430 by assigning the sequence identifier of the best candidate location to the target package 410.

At block 726, the robotic system 100 can compute current stacking heights (e.g., height of the uppermost placed package) for the placement locations 430. For example, the robotic system 100 can compute the current stacking height of the placement location 430 by measuring a vertical distance between the placement platform 308 and the top surface of placed objects at the placement location 430 and. The robotic system 100 can be configured to analyze depth measures (e.g., cloud point data) from imaging sensors in real-time to determine the vertical distance between the base surface of the placement platform 308 and the top surface of the placed objects. In other embodiments, the robotic system 100 can determine the current stacking heights by retrieving recorded vertical distance measures from the master data 252. Additionally or alternatively, the robotic system 100 can compute the current stacking height using characteristics/traits (e.g. height measurement) of identified sets of stacked packages at the placement locations 430.

At block 732, the robotic system 100 can identify a set of stacked packages (e.g., packages previously placed by the robot unit) at the placement location 430 to determine physical dimensions of individual packages in the set of stacked packages. For example, the robotic system 100 can identify the individual packages using recorded logs (e.g., sequence of motion plans) for the placement location 430 from tracked history/log. The robotic system 100 can retrieve physical properties (e.g., height) of each individual package from the master data 252. Alternatively, in the absence of the recorded logs, the robotic system 100 can determine heights of each individual package in real-time using depth measures (e.g., cloud point) from imaging sensors. The robotic system 100 can use the depth measures to determine the heights as a distance between a top surface and a bottom surface of each individual package. Also, the robotic system 100 can displace the individual packages in the set of stacked packages using the robotic arm 302 to distinguish the top surface and bottom surface of each individual package.

At block 734, the robotic system 100 can calculate total height (e.g., current stack height of stacked packages at placement location 430) based on the heights of the individual packages. For example, the robotic system 100 can calculate the total height of the placement location 430 by combining the individual package heights for the stacked packages. The total height of the placement location 430 can represent the vertical distance from the placement platform 308 to a top surface of the stacked packages. Also, the total height of the placement location 430 represents the current stacking height of the placement location 430.

At block 728, the robotic system can select the target placement location 430 using the current stack heights and the sequence identifiers 450 of the placement locations 430. For example, the robotic system 100 can use the current stack heights and the sequence identifiers 450 to identify candidate locations that can be selected as the target placement location 430. The robotic system 100 can calculate the combined stack heights of the candidate locations that represent placing the target package 410 onto the placement platform 308 and or the stacked packages at the candidate location. Using the combined stack heights of the candidate locations and the current stacking heights of the remaining placement locations, the robotic system 100 can determine the candidate location that has a highest cumulative stack height.

At block 736, the robotic system 100 can identify the candidate locations comprising of placement locations 430 that can be selected as the target placement location 430. For example, the robotic system 100 can identify candidate locations that, when the target object is placed, each candidate location maintains a corresponding result height within the stacking height limit. Additionally or alternatively, the resulting heights of the candidate locations maintain the current stacking heights of placement locations near the robot unit to be lower or equal to the current stacking heights of placement locations farther from the robot unit. In other embodiments, the robotic system 100 can identify candidate locations that comply with either the placement rule or the exception rule.

At block 738, the robotic system 100 can calculate the combined stack heights of the candidate locations. For example, the robotic system 100 can calculate the combined stack heights of the candidate locations by adding the target package 410 height to the current stacking heights of the candidate locations.

At block 740, the robotic system 100 can determine the target placement location 430 using the combined stack heights of the candidate locations and the current stacking heights of the remaining placement locations. For example, the robotic system 100 can determine the target placement location 430 by calculating a cumulative stack height for each candidate location by adding the corresponding combined stack height to the current stacking heights of the remaining placement locations. The robotic system 100 can select the candidate location with the highest cumulative stack height as the target placement location 430 for the target package 410. In other embodiments, the robotic system 100 can determine the target placement location 430 by comparing the combined stack heights of the candidate locations and selecting the candidate location with the highest combined stack height. The robotic system 100 can assign the sequence identifier of the target placement location 430 to the target package 410.

At block 712, the robotic system 100 can derive and implement a stacking motion plan for the target package 410 using the target placement location 430. For example, the robotic system 100 can use the sequence identifier of the target placement location 430 assigned to the target package 410 to retrieve location information of the target placement location 430. In some embodiments, the robotic system can use the location information to derive the stacking motion plan that corresponds to the target placement location. Each stacking motion plan can correspond to an object and include a stacking motion path or a corresponding set of commands/settings for the object and/or robotic unit 440$s$ (e.g., a robotic arm and/or an end-effector). The stacking motion plan can correspond to operations of the robotic unit 440$s$ to approach an object at its starting location, grip the object with the end-effector, lift and transfer the object to its placement location, and release/place the object at the target placement location. In some embodiments, the robotic system 100 can derive a path for the target object iteratively and in reverse order (e.g., from the placement location to the start location) using incremental changes in the candidate locations. The robotic system 100 can keep the sequence of locations that avoid collision and minimize traveled distance, maneuvers, resources, and/or other consumptive parameters to derive the path. The robotic system 100 can use the resulting path to derive the motion plan.

The robotic system 100 can implement the stacking motion plan, such as by communicating one or more of the stacking motion plans and/or corresponding commands/settings to targeted robotic unit 440$s$. The robotic system can further implement the motion plan by executing the commands/settings at the targeted robotic unit 440$s$. Accordingly, the robotic system can operate the robotic unit 440$s$ to transfer the objects from the start locations to the respective target placement locations according to the stacking motion plan.

The robotic system 100 can repeat the above-described processes each time a new object is received or arrives at the start location. For example, one or more sensors (e.g., crossing sensor, weight sensor, or the like) can indicate the presence of a new object at one of the inbound conveyors to the task station. The robotic system 100 can obtain the image data corresponding to the new object, detect or identify the new object, and then determine the target placement location for the new object. Once the placement location is determined, the robotic system 100 can derive and implement the corresponding motion plan to transfer the object to the target placement location. The robotic system 100 can repeat the process until the intended set of objects have been packed and/or all placement locations have reached a maximum allowable height.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:

identifying a package set representing available packages for placement on a platform;

obtaining a set of object properties of one or more packages in the package set, wherein the object properties represent physical dimensions, shapes, or a combination thereof of the one or more packages in the package set;

determining placement locations on the platform using the set of object properties, wherein the placement locations represent stacking locations for the package set or a portion thereof;

computing a set of distances for the placement locations, wherein the distance is between a corresponding one of the placement locations and a robotic unit that is configured to transfer the package set to the platform;

generating a sequence identifier for each of the placement locations based on the corresponding distance;

determining for a target package a target placement location from the placement locations, wherein the target placement location is determined by:

computing current stack heights of the placement locations; and selecting the target placement location using the sequence identifier and the set of current stack heights, wherein a resulting height of the selected target placement location is within a stacking height limit and maintains heights of stacks nearer to the base robot lower or equal to heights of stacks farther from the base; and implementing a motion plan for placing the target package on the platform at the target placement location.

2. The method of claim 1, wherein:

computing the current stack heights includes:

identifying a set of stacked packages currently placed at each of the placement locations;

calculating a total height for each of the placement locations, wherein the total height represents a vertical distance from the platform to a top surface of packages placed at the corresponding one of the placement locations; and determining the target placement location includes:

using the sequence identifier, identifying candidate locations that, when the target object is placed, (1) maintains the corresponding resulting height within the stacking height limit and (2) maintains the nearer stack heights lower or equal to the farther stack heights;

for each candidate location, calculating a cumulative stack height by adding the corresponding resulting height to heights of remaining stacks; and determining one of the candidate locations that has a highest cumulative stack height as the target placement location for the target package.

3. The method of claim 1, wherein:

the generated sequence identifier is higher for the placement locations that are closer to the robotic unit and lower for the placement locations that are farther from the robotic unit; and the target placement location is determined based on a height-based placement rule of $h_i \leq h_j$ for $i > j$, wherein i and j represent sequence identifiers and $h_i$ and $h_j$ represent heights at the corresponding placement locations, and wherein the height-based placement rule is configured to maintain the heights of nearer stacks lower or equal to the heights of farther stacks.

4. The method of claim 3, wherein:

the target placement location is determined based on an exception to the height-based placement rule, wherein a first candidate location has a combined stack height greater than the stacking height limit, wherein a second candidate location has a combined stack height less than the stacking height limit and greater than a current stacking height of the first candidate location, wherein a first sequence identifier corresponding to the first candidate location is before a second sequence identifier corresponding to the second candidate location, and wherein the second candidate location is selected as the target placement location.

5. The method of claim 4, wherein the target placement location is determined based on the exception to the height-based placement rule when a height difference between a current stacking height of the second candidate placement location and the stacking height limit is within a height threshold.

6. The method of claim 3, wherein:

determining the placement locations includes obtaining a packing plan that describes pre-planned locations for the package set over the platform; and the target placement location is determined based on the height-based placement rule when the target package is received out of sequence.

7. The method of claim 3, further comprising:

identifying multiple available objects for placement, wherein the multiple available objects include the target package;

determining a corresponding placement location for the available objects other than the target package; and selecting the target package for transfer when the target placement location is farther than the placement locations corresponding to the other available objects.

8. The method of claim 7, further comprising:

calculating a remaining height at each of the placement locations, wherein the remaining height corresponds to a difference between the current stack height at the corresponding one of the placement locations and the stacking height limit; and wherein the target placement location is determined based on the exception to the height-based placement rule when the remaining height is less than the physical dimensions of the package set.

9. The method of claim 1, wherein determining the target placement location for the target package includes:

identifying abnormal object properties associated with the target package, wherein the abnormal object properties correspond to physical deviations of the target package, including deformation, bending, misalignment, and/or partial closing, and wherein the abnormal object properties prevent additional stacking on top of the target package; and adjusting the stacking height limit using the identified abnormal object properties.

10. The method of claim 1, wherein a subset of properties in the set of object properties includes one or more lateral dimensions remaining fixed across the one or more packages in the package set.

11. A tangible, non-transient computer-readable medium having instructions stored thereon that, when executed by a processor, cause the processor to perform a method, the method comprising:

identifying a package set representing available packages for placement on a platform;

obtaining a set of object properties of one or more packages in the package set, wherein the object properties represent physical dimensions, shapes, or a combination thereof of the one or more packages in the package set;

determining placement locations on the platform using the set of object properties, wherein the placement locations represent stacking locations for the package set or a portion thereof;

computing a set of distances for the placement locations, wherein the distance is between a corresponding one of the placement locations and a robotic unit that is configured to transfer the package set to the platform;

generating a sequence identifier for each of the placement locations based on the corresponding distance;

determining for a target package a target placement location from the placement locations, wherein the target placement location is determined by:

computing current stack heights of the placement locations; and selecting the target placement location using the sequence identifier and the set of current stack heights, wherein a resulting height of the selected target placement location is within a stacking height limit and maintains heights of stacks nearer to the base robot lower or equal to heights of stacks farther from the base; and implementing a motion plan for placing the target package on the platform at the target placement location.

12. The tangible, non-transient computer-readable medium of claim 11, wherein:

the generated sequence identifier is higher for the placement locations that are closer to the robotic unit and lower for the placement locations that are farther from the robotic unit; and the target placement location is determined based on a height-based placement rule of $h_i \leq h_j$ for $i > j$, wherein i and j represent sequence identifiers and $h_i$ and $h_j$ represent heights at the corresponding placement locations, and wherein the height-based placement rule is configured to maintain the heights of nearer stacks lower or equal to the heights of farther stacks.

13. The tangible, non-transient computer-readable medium of claim 12, wherein:

the target placement location is determined based on an exception to the height-based placement rule, wherein a first candidate location has a combined stack height greater than the stacking height limit, wherein a second candidate location has a combined stack height less than the stacking height limit and greater than a current stacking height of the first candidate location, wherein a first sequence identifier corresponding to the first candidate location is before a second sequence identifier corresponding to the second candidate location, and wherein the second candidate location is selected as the target placement location.

14. The tangible, non-transient computer-readable medium of claim 12, wherein:

determining the placement locations includes obtaining a packing plan that describes pre-planned locations for the package set over the platform; and the target placement location is determined based on the height-based placement rule when the target package is received out of sequence.

15. The tangible, non-transient computer-readable medium of claim 12, wherein the method further comprising:

identifying multiple available objects for placement, wherein the multiple available objects include the target package;

determining a corresponding placement location for the available objects other than the target package; and selecting the target package for transfer when the target placement location is farther than the placement locations corresponding to the other available objects.

16. A robotic system comprising:

at least one processor; and at least one memory device coupled to the at least one processor, the at least one memory having instructions stored thereon, that when executed by the processor, causes the processor to:

identify a package set representing available packages for placement;

obtain a set of object properties of one or more packages in the package set;

determine placement locations on a platform using the set of object properties, wherein the placement locations represent stacking locations for the package set or a portion thereof;

compute a set of distances for the placement locations, wherein the distance is between a corresponding one of the placement locations and a robotic unit that is configured to transfer the package set to the platform;

generate a sequence identifier for each of the placement locations based on the corresponding distance;

determine for a target package a target placement location from the placement locations; and implement a motion plan for placing the target package on the platform at the target placement location.

17. The robotic system of claim 16, wherein:

the generated sequence identifier is higher for the placement locations that are closer to the robotic unit and lower for the placement locations that are farther from the robotic unit; and the target placement location is determined based on a height-based placement rule of $h_i \leq h_j$ for $i > j$, wherein i and j represent sequence identifiers and $h_i$ and $h_j$ represent heights at the corresponding placement locations, and wherein the height-based placement rule is configured to maintain the heights of nearer stacks lower or equal to the heights of farther stacks.

18. The robotic system of claim 17, wherein:

the target placement location is determined based on an exception to the height-based placement rule, wherein a first candidate location has a combined stack height greater than the stacking height limit, wherein a second candidate location has a combined stack height less than the stacking height limit and greater than a current stacking height of the first candidate location, wherein a first sequence identifier corresponding to the first candidate location is before a second sequence identifier corresponding to the second candidate location, and wherein the second candidate location is selected as the target placement location.

19. The robotic system of claim 17, wherein:

determining the placement locations includes obtaining a packing plan that describes pre-planned locations for the package set over the platform; and the target placement location is determined based on the height-based placement rule when the target package is received out of sequence.

20. The robotic system of claim 17, wherein the at least one memory includes instructions executable by the processor to:

identify multiple available objects for placement, wherein the multiple available objects include the target package;

determine a corresponding placement location for the available objects other than the target package; and select the target package for transfer when the target placement location is farther than the placement locations corresponding to the other available objects.

\* \* \* \* \*